United States Patent [19]
Fleischer
[11] 3,715,679
[45] Feb. 6, 1973

[54] ACTIVE RC DELAY EQUALIZER

[75] Inventor: Paul Egon Fleischer, Little Silver, N.J.

[73] Assignee: Bell Telephone Laboratories, Incorporated, Murray Hill, N.J.

[22] Filed: July 29, 1971

[21] Appl. No.: 167,241

[52] U.S. Cl...................330/107, 330/109, 333/28 R
[51] Int. Cl...............................................H03f 1/36
[58] Field of Search.......333/28 R; 330/107, 109, 21, 330/31

[56] References Cited

UNITED STATES PATENTS

| | | | |
|---|---|---|---|
| 3,551,872 | 12/1970 | Emmott et al. | 338/202 |
| 3,348,171 | 10/1967 | Kawashima et al. | 333/28 R |
| 3,636,466 | 1/1972 | Mossberg et al. | 330/85 |

OTHER PUBLICATIONS

Muir et al., "Design of Active RC Filters Using Operational Amplifiers," Systems Technology April 1968, pp. 18–30.

*Primary Examiner*—Roy Lake
*Assistant Examiner*—James B. Mullins
*Attorney*—R. J. Guenther et al.

[57] ABSTRACT

An active resistance-capacitance (RC) delay equalizer circuit which exhibits an "all-pass" transfer characteristic is disclosed. The quality factor, Q, and the center frequency of the equalizer delay characteristic are independently adjustably by sliding switches which alter predetermined circuit resistor values. The equalizer circuit is preferably realized using operational amplifiers bonded to a thin film circuit substrate.

13 Claims, 6 Drawing Figures

ACTIVE RC DELAY EQUALIZER

BACKGROUND OF THE INVENTION

This invention pertains to active equalizer circuits and, more particularly, to resistance-capacitance (RC) active delay equalizer circuits.

The transmission of digital and analog information over voiceband channels requires that the envelope delay, i.e., the derivative of the phase shift introduced by the communication cables, be sufficiently uniform so as not to corrupt the information being transmitted. Of course, no cable is ideal and is thus subject to variation in signal transmission characteristics with changes in signal frequency. It thus becomes necessary to equalize the channel, i.e., introduce certain amounts of delay in selected portions of the signal frequency spectrum to compensate for nonuniform delay introduced by the cable. This means that the equalizers must have a total delay complementary to that of the unequalized system so that the sum of equalizer delay and system delay is approximately constant with frequency at a value greater than the maximum delay of the unequalized system. A discussion of delay equalizers and the important function which they perform may be found in the article entitled "Attenuation and Delay Equalizers for Coaxial Lines," authored by W. R. Lundry, *Trans. of the AIEE*, Vol. 68, 1949, pp. 1174–1179.

In one prior art scheme, a large family of fixed single section delay equalizers is used. A computer program is utilized to select those members of the family required to equalize a particular cable. Since the number of equalizers used must be practically limited, many required delay shapes are not available. Thus, tight tolerances cannot be met or, if they are met, an excessively large number of equalizers are required. There is, of course, the further difficulty and expense of maintaining a large stock of diverse equalizers.

Another approach of the prior art is to use custom tailored multisection delay equalizers which match the specific requirements of a particular system. They, of course, perform excellently their assigned task but suffer from the limitation that they are not readily employable in systems other than the particular one for which they were designed.

It is an object of this invention to improve upon these and other prior art equalization schemes by utilizing a fewer number of equalizers having a wide variety of adjustable delay bump center frequencies and quality factors.

SUMMARY OF THE INVENTION

This, and other objects, are accomplished in accordance with the principles of this invention by using an active RC equalizer circuit which has an all-pass transfer function. This type of equalizer provides a second order delay vs. frequency characteristic, i.e., a bump, and is most advantageously realized using beam leaded operational amplifiers bonded to a thin film circuit substrate. The stiffness of the bump, stiffness being usually defined as equal to twice the quality factor Q, and the bump center frequency of the equalizer are independently adjustably by resistive tuning, using sliding switches which make contact with the terminals of thin film resistors on the substrate. Various network configurations are employed to reduce the number of circuit elements and thereby reduce the size and cost of the equalizer circuit.

DETAILED DESCRIPTION

Figure 1:
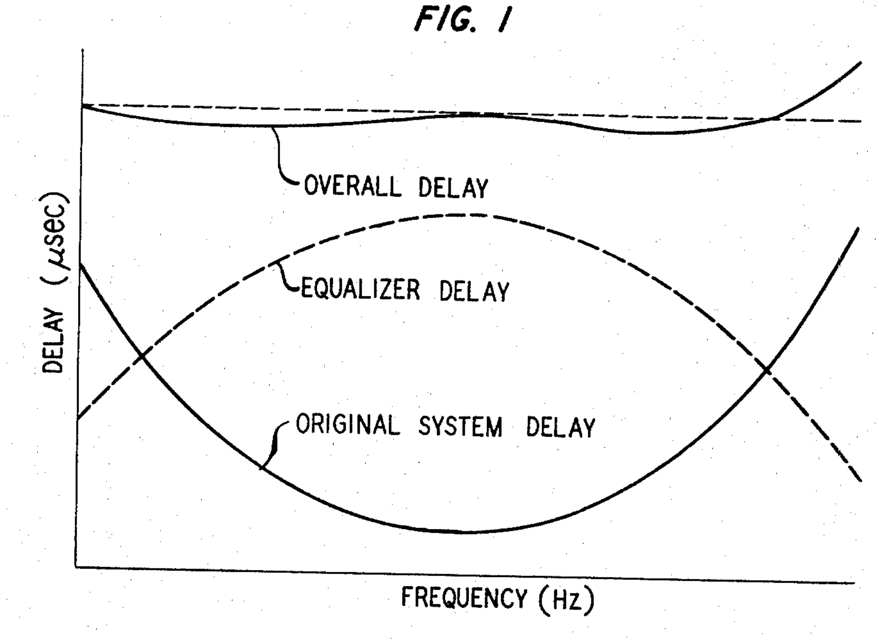
FIG. 1 illustrates a typical delay vs. frequency characteristic of a signal transmission system and the manner in which the system is equalized.

FIG. 1 illustrates a typical delay characteristic of a voiceband transmission system. Unfortunately, as illustrated, the various signal frequencies in the voiceband are not equally delayed by a typical system; hence, delay equalizers are used to introduce a complementary delay as shown in FIG. 1. If the delay equalizer is properly chosen, it causes frequencies within the desired band of signals to be uniformly delayed. Equalization is normally accomplished by cascading a number of all-pass networks having diverse delay characteristics to achieve the desired overall flat delay.

Figure 3:
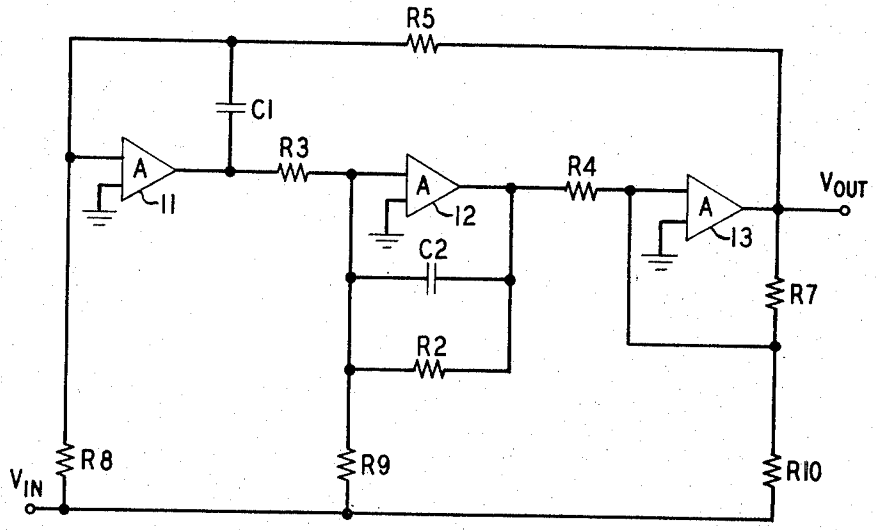
FIG. 3 illustrates a simplified equivalent circuit of the delay equalizer circuit of FIG. 3.
Figure 2:
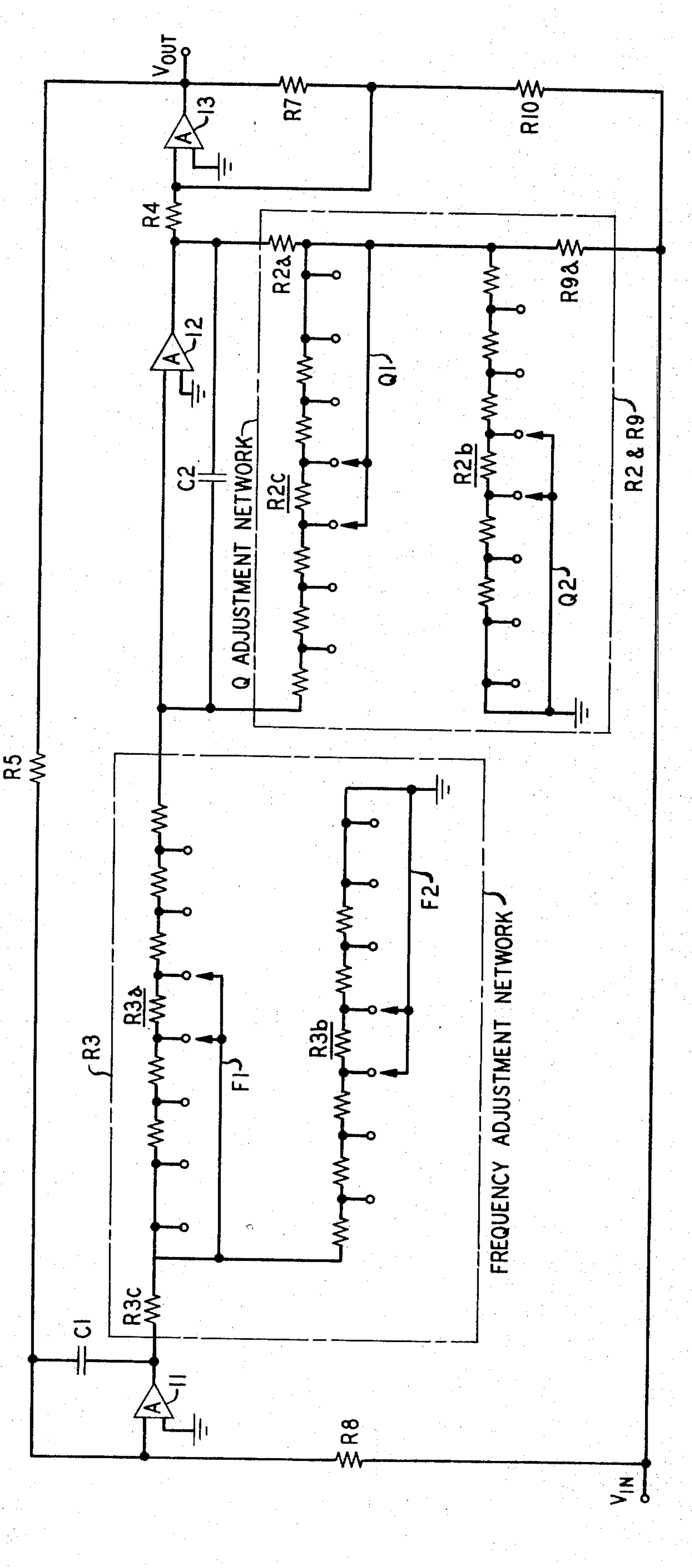
FIG. 2 illustrates the delay equalizer circuit of this invention.

FIG. 2 depicts an active all-pass RC delay equalizer circuit, embodying the principles of this invention, which may be cascaded with other such equalizers to efficiently and accurately equalize voiceband circuits. FIG. 3 shows a simplified equivalent circuit of the circuit of FIG. 2, the operation of which will aid in an understanding of the operation of this invention. Like or analogous elements have been identically identified. Amplifiers 11, 12, and 13 are preferably feedback operational amplifiers, resistively coupled by resistors $R_3$ and $R_4$ and feedback resistor $R_5$. Resistors $R_8$, $R_9$, and $R_{10}$ apply the input signal to the input terminals of amplifiers 11, 12, and 13, respectively. It may be shown that the transfer function T(*s*) of the circuit of FIG. 3 is given by:

$$T(s)=\frac{V_{out}}{V_{in}}=-\frac{R_7}{R_{10}}\cdot\frac{s^2+\left(1-\frac{R_2R_{10}}{R_4R_9}\right)\frac{1}{R_2C_2}s+\frac{R_{10}}{R_8}\frac{1}{R_3R_4C_1C_2}}{s^2+\frac{1}{R_2C_2}s+\frac{R_7}{R_5}\frac{1}{R_3R_4C_1C_2}}. \quad (1)$$

What is desired is a network having an all-pass or phase equalization characteristic, $$T(s)=-[s^2-as+\omega_o^2]/[s^2+as+\omega_o^2]. \quad (2)$$

The magnitude of the transfer function of Eq. (2) is equal to unity; thus, such a network only alters the phase of applied signals. The phase shift as a function of frequency, $\omega$, corresponding to this transfer function is:

$$B(\omega)=-2\tan^{-1}[a\omega/(\omega_0^2-\omega^2)]. \quad (3)$$

The phase shift defined by Eq. (3) is monotonically decreasing starting at 0° for $\omega=0°$, becoming 180° at $\omega=\omega_o$, and 360° at $\omega=\infty$. Since the envelope delay is the negative of the derivative of the phase shift with respect to frequency, the delay, $\tau$, introduced by such a network is:

$$\tau=-d/d\omega(B))=2a(\omega^2+\omega_o^2))/[(\omega^2-\omega_o^2)^2+a^2\omega^2]. \quad (4)$$

At the frequency $\omega = \omega_o$, the delay is equal to $4/a$. If the delay characteristic of Eq. (4) were plotted versus frequency, $\omega$, it would have the shape of a bump with the maximum $4/a$ occurring approximately at the center frequency $\omega = \omega_o$. The quality factor, Q, or the stiffness, 2Q, of the so-called bump is thus related to term $a$ of Eq. (2). Accordingly, to obtain delay characteristics having different center frequencies and Qs, the parameters $\omega_o$ and $a$ must be variable.

Referring again to the equivalent circuit of FIG. 3, and the transfer characteristics of Eqs. (1) and (2), in order to obtain the desired all-pass behavior, it is necessary that:

$$R_7 = R_{10} \text{ for unity gain.} \quad (5)$$

Furthermore, in order that the linear coefficients of the numerator and denominator of Eq. (1) be negatives of each other, it is necessary that:

$$1 - (R_2R_{10}/R_4R_9) = -1, \text{ i.e., } R_2R_{10}/R_4R_9 = 2\,. \quad (6)$$

Equality of the last terms of the numerator and denominator of Eq. (1) is obtained by letting:

$$R_8 = R_5\,, \quad (7)$$

since $R_7 = R_{10}$. To satisfy Eq. (6), we let:

$$R_4 = R_{10}/2\,, \quad (8a)$$

$$\text{and } R_2 = R_9\,. \quad (8b)$$

Thus, resistor $R_2$ must track resistor $R_9$. Satisfying the requirements of Eqs. (5) through (8), it will be noted that transfer function of Eq. (1) is equivalent to that of Eq. (2) where:

$$a = 1/R_2C_2\,, \quad (9a)$$

and $$\omega_o^2 = (R_{10}/R_8)\,(1/R_3R_4C_1C_2) = (R_7/R_5)\,(1/R_3R_4C_1C_2) \quad (9b)$$

It is one of the advantages of this invention that the parameters $\omega_o$ and $a$ determining the center frequency and Q, respectively, of the equalizer characteristic are readily and independently altered by simply changing resistor values as per Eq. (9).

Since the delay equalizer of this invention may be used in a variety of different applications, it must be capable of providing a great diversity of transfer characteristics. As an illustrative example, the circuit of FIG. 2 is adjustable to provide thirty-six different center frequencies and thirty-six different Q factors. Since these adjustments are independent, a total of 1,296 different equalizer bump shapes are available from one equalizer circuit. The flexibility thus provided will permit fewer cascaded equalizer circuits to more than adequately compensate the delay of a given system. To obtain small size equalizers as well as production economy, the equalizer of FIG. 2 is advantageously realized as a thin film circuit with beam leaded operational amplifier chips bonded to the thin film substrate. Such technology is well known in the art and will not be discussed to avoid undue complication of this disclosure.

To realize the variable resistors required to obtain the various delay shapes, it has been found advantageous to use sliding double-contact switches, which move in channels in a plastic case enclosing the equalizer substrate, and which make contact with the terminals of thin film resistors. A similar type of sliding switch arrangement is shown in U. S. Pat. No. 3,551,872 issued to J.T. Emmott et al on Dec. 29, 1970. Any other equivalent arrangements are suitable.

Figure 4:
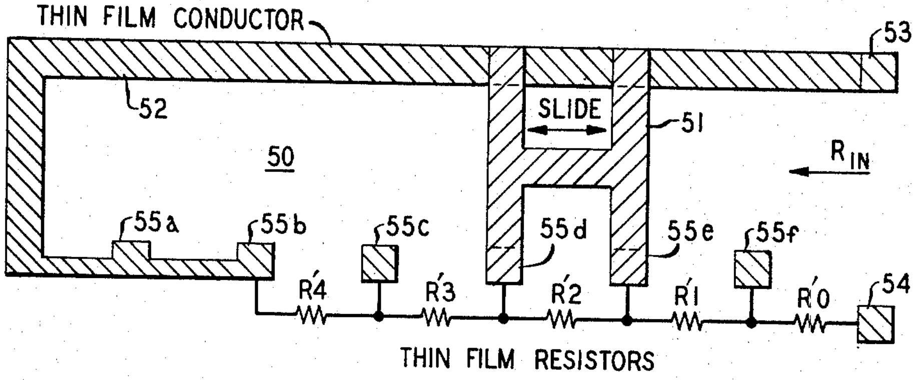
FIG. 4 depicts the manner in which a sliding switch may be used with thin film resistors to alter the total input resistance of such a resistive network configuration.

FIG. 4 is an illustrative drawing indicating the manner in which resistor values may be changed using a double-contact sliding switch. As slide conductor 51 is moved from one end to the other of thin film resistive network assembly 50, the total resistance $R_{in}$ between terminals 53 and 54 increases from a value of $R'_0$ to $R'_0 + R'_1 + R'_2 + R'_3 + R'_4$. Thus, slide 51 shorts out any resistors which appear on the side of the slide farthermost from input terminals 53 and 54. Slide 51 has a double-contact feature to allow simultaneous contact on conductor rail 52 and on conductor pads 55 to improve reliability, since failure of a single contact will result either in no change or a change in value of resistance to the next position in the effective resistive value range of $R_{in}$.

Figure 5:
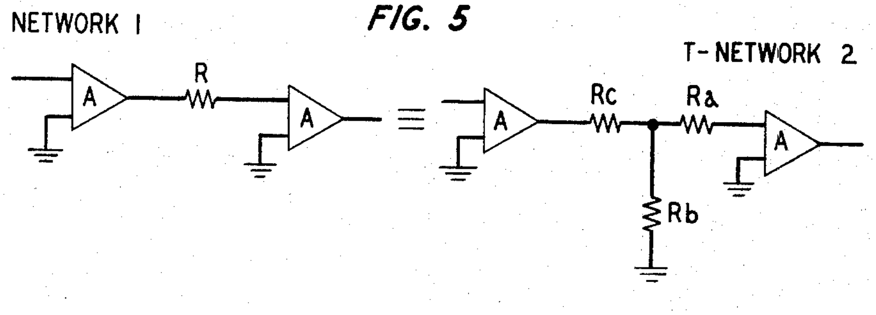
FIG. 5 illustrates a first network equivalence.

If the variable resistor mechanism of FIG. 4 were used in the straightforward manner indicated, each desired resistor value would require a distinct switch position; since the number of delay equalizer adjustments is large, two, as per Eq. (9), very long switches would be required, thus defeating the use of thin film technology to miniaturize the equalizer circuitry. In accordance with this invention, a much more efficient design is possible by replacing a single resistor with a T-network as shown in FIG. 5. It may be shown that network 1 and T-network 2 have the same effective transfer resistance if:

$$R = R_a + R_c + R_aR_c/R_b. \quad (10)$$

By exploiting this equivalence, the effective value of the resistance $R$ may be varied by changing any of the three resistors $R_a$, $R_b$, or $R_c$. In particular, if $R_a$ and $R_b$ are each realized using a six-position switch similar to that of FIG. 4, a total of 36 distinct equivalent resistor values $R$ are available, thus obviating the need for a long 36 position switch. Furthermore, in accordance with this invention, the successive equivalent resistive values of a switched network configuration may be made to form an approximate geometric series. This is a type of variation extremely advantageous in equalizer configurations, since it realizes equal percent increments in the parameter being varied.

The manner in which this result is obtained is as follows. Let $R_c$ be fixed and let $R_a^{(i)}$, $i = 0,1,2,3,4$ and $R_b^{(j)}$, $j = 0,1,2,3,4$ represent the resistor values which $R_a$ and $R_b$ assume. Then, from Eq. (10):

$$R_{ij} = R_c + R_a^{(i)}\,[1 + (R_c/R_b^{(j)})]. \quad (11)$$

If we let $$R_a^{(i)} = R_a^{(o)}\,(1 + \Delta)^{5i}\,, \quad (12)$$

and $$[1 + (R_c/R_b^{(j)})] = K^{(o)}\,(1 + \Delta)^j, \quad (13)$$

or $$R_b^{(j)} = R_c/[K^o\,(1+\Delta)^j - 1], \quad (14)$$

where $R_a^{(o)}$, $\Delta$, and $K^{(o)}$ are predetermined design constants, then $$R_{ij} = R_c + R_a^{(o)}K^{(o)}\,(1+\Delta)^{5i+j} \quad (15)$$

$$i = 0,1,2,3,4$$

$$j = 0,1,2,3,4,$$

A geometric progression of resistive values is thus developed except for the substantially negligible disturbance caused by the constant $R_c$ term. Note that resistor $R_b$ provides a vernier control and resistor $R_a$ produces larger resistive changes. It is also noteworthy that the roles of $R_a$ and $R_c$ could be interchanged if that proved advantageous.

Thus, to realize the desired center frequency adjustment of the equalizer circuit of this invention, a T-network in accordance with FIG. 5, with adjustable resistors $R_{3a}$ and $R_{3b}$ and fixed resistor $R_{3c}$ is used to replace resistor $R_3$ of FIG. 3 as shown in FIG. 2. The switched resistor network configurations $F_1$ and $F_2$ have a direct symbolic correspondence with the structure of FIG. 4. Since the combination of switched networks $F_1$ and $F_2$ has thirty-six discrete positions, thirty-six discrete equalizer center frequency adjustments are provided by altering the value of resistor $R_3$ in accordance with Eq. (9*b*).

Figure 6:
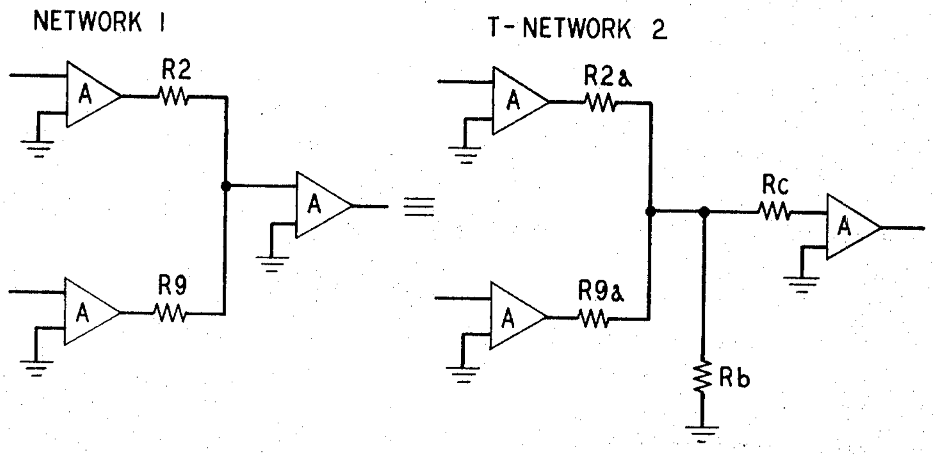
FIG. 6 illustrates a second network equivalence.

Reference to Eq. (9*a*) indicates that in order to alter the Q of the equalizer circuit, resistor $R_2$ of FIG. 3 must be varied. However, an additional problem is encountered since resistor $R_9$ has to track $R_2$ as per Eq. (8*b*). The manner in which this problem is overcome, in accordance with this invention, is indicated in FIG. 6, which is an extension of the principles embodied in the network equivalence of FIG. 5. It may be shown that network of FIG. 1. 6 is equivalent to network 2 of FIG. 6, i.e., they exhibit the same transfer resistance, if the following equations are satisfied:

$$R_2 = R_{2a} + R_c + (R_{2a}/R_{9a}) R_c + (R_{2a}R_c/R_b), \quad (16)$$

and $$R_9 = R_{9a} + R_c + (R_{9a}R_c/R_b) + (R_{9a}/R_{2a})R_c. \quad (17)$$

Now, if $$R_{9a} = R_{2a} = R_a, \quad (18)$$

then $$R_9 = R_2 = R_a + R_c\,[2 + (R_a/R_b)]. \quad (19)$$

Thus, by varying $R_c$ and $R_b$, an approximately geometric variation in Q is obtained while the effective values of the resistors $R_2$ and $R_9$ are maintained equal. FIG. 2 illustrates how the combined network configuration of resistors $R_2$ and $R_9$, using sliding switch arrangements $Q_1$ and $Q_2$, has been substituted for resistors $R_2$ and $R_9$ of FIG. 3. Again, because of this novel arrangement, 36 discrete variations in Q may be obtained without the use of long switches.

What is claimed is:

1. Active RC adjustable delay equalizer apparatus having an input terminal and an output terminal comprising:
- a first feedback amplifier having an input and output;
- a second feedback amplifier having an input and output;
- a first adjustable resistive T-network connecting said first amplifier output and the input of said second amplifier;
- a third feedback amplifier having an input and output, said output connected to said equalizer output terminal and resistively connected to the input of said first amplifier, and said input resistively connected to the output of said second amplifier;
- a second adjustable resistive T-network connecting the input and output of said second amplifier to said equalizer input terminal;
- and resistive circuit means coupling said equalizer input terminal to the inputs of said first and third amplifiers.

2. The equalizer as defined in claim 1 wherein at least one of said resistive T-networks further comprises:
- a first fixed resistive leg;
- a second slideably adjustable resistive leg;
- and a third slideably adjustable resistive leg.

3. The equalizer as defined in claim 1 wherein at least one of said adjustable resistive T-networks exhibits a geometric variation in effective resistance.

4. Active RC adjustable delay equalizer apparatus having an input terminal and an output terminal comprising:
- a first operational amplifier having feedback means connected between said amplifier's input and output;
- a second operational amplifier having feedback means connected between said amplifier's input and output;
- a first slideably adjustable resistive $\tau$ network connecting said first amplifier output and the input of said second amplifier;
- a third operational amplifier having feedback means connected between said amplifier's input and output, said output connected to said equalizer output terminal and resistively connected to the input of said first amplifier, and said input resistively connected to the output of said second amplifier;
- a second slideably adjustable resistive $\tau$ network connecting the input and output of said second amplifier to said equalizer input terminal;
- and resistive circuit means coupling said equalizer input terminal to the inputs of said first and third amplifiers.

5. The equalizer as defined in claim 4 wherein at least one of said resistive T-networks further comprises:
- a first fixed resistive leg;
- a second slideably adjustable resistive leg;
- and a third slideably adjustable resistive leg.

6. The equalizer as defined in claim 4 wherein at least one of said adjustable resistive networks exhibits a geometric variation in effective resistance.

7. An adjustable delay equalizer having first, second, and third feedback operational amplifiers, an input terminal and an output terminal, comprising:
- a first adjustable resistive $\tau$ network connecting the output of said first amplifier and the input of said second amplifier, the output of said second amplifier resistively connected to the input of said third amplifier, the output of said third amplifier connected to said equalizer output terminal and resistively connected to the input of said first amplifier;
- a second adjustable resistive $\tau$ network connecting the input and output of said second amplifier to said equalizer input terminal;
- and first resistive circuit means connecting said equalizer input terminal to the inputs of said first and third amplifiers.

8. The equalizer as defined in claim 7 wherein at least one of said resistive T-networks further comprises:
- a first fixed resistive leg;
- a second slideably adjustable resistive leg;
- and a third slideably adjustable resistive leg.

9. The equalizer as defined in claim 8 wherein at least one of said adjustable resistive T-networks exhibits a geometric variation in effective resistance.

10. An adjustable delay equalizer having first, second, and third feedback amplifiers, an input terminal and an output terminal, comprising:

a first slideably adjustable resistive T-network connecting the output of said first amplifier and the input of said second amplifier, the output of said second amplifier resistively connected to the input of said third amplifier, the output of said third amplifier connected to said equalizer output terminal;

a second slideably adjustable resistive T-network connecting the input and output of said second amplifier to said equalizer input terminal;

first resistive circuit means connecting said equalizer input terminal to the inputs of said first and third amplifiers;

and second resistive circuit means connecting the output of said third amplifier and the input of said first amplifier.

11. The equalizer as defined in claim 10 wherein at least one of said resistive T-networks further comprises: a first fixed resistive leg;

a second slideably adjustable resistive leg;

and a third slideably adjustable resistive leg.

12. The equalizer as defined in claim 11 wherein at least one of said adjustable resistive T-networks exhibits a geometric variation in effective resistance.

13. An adjustable delay equalizer having first, second, and third feedback operational amplifiers, an input terminal and an output terminal, comprising:

a first discretely adjustable resistive $\tau$ network connecting the output of said first amplifier and the input of said second amplifier, the output of said second amplifier resistively connected to the input of said third amplifier, the output of said third amplifier connected to said equalizer output terminal and resistively connected to the input of said first amplifier;

a second discretely adjustable resistive $\tau$ network connecting the input and output of said second amplifier to said equalizer input terminal;

and first resistive circuit means connecting said equalizer input terminal to the inputs of said first and third amplifiers.

* * * * *